United States Patent
Kim et al.

(10) Patent No.: US 10,101,927 B2
(45) Date of Patent: Oct. 16, 2018

(54) DATA STORAGE DEVICE AND OPERATING METHOD THEREOF

(71) Applicant: SK hynix Inc., Gyeonggi-do (KR)

(72) Inventors: Soo Nyun Kim, Gyeonggi-do (KR); Jin Woong Kim, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 0 days.

(21) Appl. No.: 15/002,083

(22) Filed: Jan. 20, 2016

(65) Prior Publication Data

US 2017/0131925 A1    May 11, 2017

(30) Foreign Application Priority Data

Nov. 6, 2015 (KR) .................. 10-2015-0155567

(51) Int. Cl.
*G06F 3/06* (2006.01)
*G06F 12/02* (2006.01)

(52) U.S. Cl.
CPC ............ *G06F 3/0619* (2013.01); *G06F 3/065* (2013.01); *G06F 3/0608* (2013.01); *G06F 3/0665* (2013.01); *G06F 3/0679* (2013.01); *G06F 3/0688* (2013.01); *G06F 12/0246* (2013.01); *G06F 2212/7201* (2013.01); *G06F 2212/7209* (2013.01)

(58) Field of Classification Search
CPC ................................ G06F 3/06; G06F 3/0246
USPC ......................................... 711/202, 203, 170
See application file for complete search history.

(56) References Cited

U.S. PATENT DOCUMENTS

| | | | | |
|---|---|---|---|---|
| 8,151,060 B2* | 4/2012 | Mizushima | ......... | G06F 11/1415 711/103 |
| 9,678,874 B2* | 6/2017 | Nellans | ............... | G06F 12/0804 |
| 2011/0106804 A1* | 5/2011 | Keeler | .................... | G06F 3/061 707/737 |
| 2012/0054427 A1* | 3/2012 | Huang | ..................... | G06F 3/06 711/108 |
| 2012/0210041 A1* | 8/2012 | Flynn | ...................... | G06F 1/183 711/3 |
| 2012/0272038 A1* | 10/2012 | Wei | ........................ | G06F 3/0613 711/206 |
| 2013/0166816 A1* | 6/2013 | Atkisson | ............. | G06F 12/0802 711/102 |
| 2013/0185485 A1* | 7/2013 | Kim | ...................... | G06F 12/0246 711/103 |
| 2013/0246732 A1* | 9/2013 | Seng | ................... | G06F 12/0246 711/203 |
| 2014/0237164 A1* | 8/2014 | Le | ....................... | G06F 12/0246 711/103 |

FOREIGN PATENT DOCUMENTS

KR   1020110066697   6/2011

\* cited by examiner

*Primary Examiner* — Pierre Miche Bataille
(74) *Attorney, Agent, or Firm* — IP & T Group LLP (57) ABSTRACT

A data storage device includes a nonvolatile memory device, and a controller configured to construct logical address sets each including a start logical address and valid address flags corresponding to the start logical address, from logical addresses provided from a host device, generate an address mapping table by mapping each of the logical address sets to a physical address of the nonvolatile memory device, and perform a request from the host device, by referring to the address mapping table.

8 Claims, 10 Drawing Sheets

| SLA | F1 | F2 | F3 |     |           |
|-----|----|----|----|-----|-----------|
| 0   | 1  | 1  | 1  | ⇒   | LA0,LA1,LA2 |
| 3   | 1  | 1  | 0  | ⇒   | LA3,LA4   |
| 6   | 1  | 0  | 1  | ⇒   | LA6,LA8   |
| 9   | 1  | 0  | 0  | ⇒   | LA9       |

DATA STORAGE DEVICE AND OPERATING METHOD THEREOF

CROSS-REFERENCES TO RELATED APPLICATION

The present application claims priority under 35 U.S.C. § 119(a) to Korean application number 10-2015-0155567, filed on Nov. 6, 2015, in the Korean Intellectual Property Office, which is incorporated herein by reference in its entirety.

BACKGROUND

1. Technical Field

Various embodiments generally relate to a data storage device and more particularly to a method for constructing an address mapping table of a data storage device.

2. Related Art

The paradigm for the computer environment has shifted into ubiquitous computing so that computer systems can be used anytime and anywhere. As a result use of portable electronic devices, such as mobile phones, digital cameras, and notebook computers has rapidly increased. Such portable electronic devices use a data storage device employing a semiconductor memory device for storing data.

A data storage device using a semiconductor memory device provides excellent stability and durability and can operate with high information access speed and low power consumption, since it has no mechanical moving part. Examples of data storage devices having such advantages include a universal serial bus (USB) memory device, memory cards having various interfaces, and a solid state drive (SSD).

Generally, a host device coupled to a data storage device provides a logical address to the data storage device. The data storage device converts the provided logical address into a corresponding physical address, and performs a requested operation based on the converted physical address. For such an address converting operation, the data storage device may employ an address mapping table.

SUMMARY

Various embodiments are directed to a method for constructing an address mapping table of a data storage device.

In an embodiment, a data storage device may include a nonvolatile memory device, and a controller suitable for constructing logical address sets each including a start logical address and valid address flags corresponding to the start logical address, from logical addresses provided from a host device, generating an address mapping table by mapping each of the logical address sets to a physical address of the nonvolatile memory device, and performing a request from the host device, by referring to the address mapping table.

In an embodiment, a method for operating a data storage device including a nonvolatile memory device may include constructing logical address sets each including a start logical address and valid address flags corresponding to the start logical address, from logical addresses provided from a host device; generating an address mapping table by mapping each of the logical address sets to a physical address of the nonvolatile memory device, and performing a request from the host device, by referring to the address mapping table.

In an embodiment, a data storage device may include a nonvolatile memory device, and a controller suitable for constructing logical address sets from a plurality of logical addresses, wherein each of the logical address sets includes a start logical address and valid address flags indicating whether successive logical addresses from the start logical address are valid or not, and mapping the logical address sets to physical addresses of the nonvolatile memory device.

According to the embodiments, the size of an address mapping table may be reduced.

DETAILED DESCRIPTION

In the present invention, advantages, features and methods for achieving them will become more apparent after a reading of the following exemplary embodiments taken in conjunction with the drawings. The present invention may, however, be embodied in different forms and should not be construed as being limited to the embodiments set forth herein. Rather, these embodiments are provided to describe the present invention in sufficient detail to enable a person skilled in the art to which the invention pertains to practice the present invention.

It is to be understood, that embodiments of the present invention are not limited to the particulars shown in the drawings, that the drawings are not necessarily to scale and in some instances proportions may have been exaggerated in order to more clearly depict certain features of the invention. Furthermore, while particular terminology may be used herein, it is to be appreciated that the terminology used herein is for the purpose of describing particular embodiments only and is not intended to limit the scope of the present invention.

Also, as used herein, the term "and/or" includes any and all combinations of one or more of the associated listed items. Moreover, it will be understood that when an element is referred to as being "on," "connected to" or "coupled to" another element, it may be directly on, connected or coupled to the other element or intervening elements may be present. As used herein, a singular form is intended to include plural forms as well, unless the context clearly indicates otherwise. It will be further understood that the terms "comprises," "comprising," "includes," and/or "including" when used in this specification, specify the presence of at least one stated feature, step, operation, and/or element, and do not preclude the presence or addition of one or more other features, steps, operations, and/or elements thereof.

Hereinafter, a data storage device and an operating method thereof will be described below with reference to the accompanying drawings through various embodiments.

Figure 1:
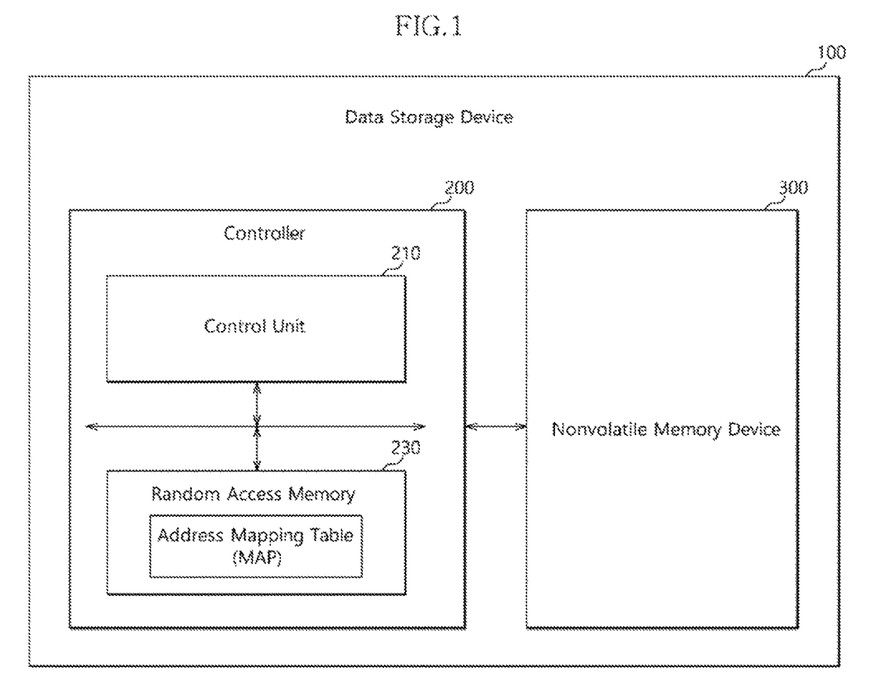
FIG. 1 is a block diagram illustrating a data storage device, according to an embodiment of the present invention.

Referring now to FIG. 1 a data storage device 100 is provided, according to an embodiment of the invention. The data storage device 100 may store data to be accessed by a host device (not shown) such as a mobile phone, an MP3 player, a laptop computer, a desktop computer, a game player, a TV, an in-vehicle infotainment system, and/or the like. The data storage device 100 may also be referred to hereinafter as a memory system.

The data storage device 100 may be manufactured as any one of various kinds of storage devices depending on the protocol of an interface which may electrically couple the data storage device 100 with a host device. For example, the data storage device 100 may be configured as any one of various kinds of storage devices such as a solid state drive a multimedia card in the form of an MMC, an eMMC, an RS-MMC and a micro-MMC, a secure digital card in the form of an SD, a mini-SD and a micro-SD, a universal serial bus (USB) storage device, a universal flash storage (UFS) device, a personal computer memory card international association (PCMCIA) card, a peripheral component interconnection (PCI) card, a PCI express (PCI-E) card, a compact flash CF card, a smart media card, a memory stick, and/or the like.

The data storage device 100 may be manufactured as any one of various package types. For example, the data storage device 100 may be manufactured as any one of various package types such as a package-on-package (POP), a system-in-package (SIP), a system-on-chip (SOC), a multi-chip package (MCP), a chip-on-board (COB), a wafer-level fabricated package (WFP), a wafer-level stack package (WSP) and/or the like.

The data storage device 100 may include a nonvolatile memory device 300. The nonvolatile memory device 300 may operate as the storage medium of the data storage device 100. The nonvolatile memory device 300 may be configured by any one of various types of nonvolatile memory devices such as a NAND flash memory device, a NOR flash memory device a ferroelectric random access memory (FRAM) using a ferroelectric capacitor, a magnetoresistive random access memory (MRAM) using a tunneling magnetoresistance (TMR) layer, a phase change random access memory (PRAM) using a chalcogenide alloy, and a resistive random access memory (ReRAM) using a transition metal oxide, depending on types of memory cells which construct a memory cell area.

The data storage device 100 may include a controller 200. Any suitable controller may be used. The controller may control the general operations of the data storage device. For example, the controller, may analyze and process a signal or a request received from a host device. The controller 200 may transmit data received from the host device to the nonvolatile memory device 300. The controller 200 may transmit data received from the nonvolatile memory device 300 to the host device. The controller 200 may temporarily store any data to be transmitted between the host device and the nonvolatile memory device 300.

The controller may be implemented in the form of hardware, software and/or any combination thereof.

In the embodiment of FIG. 1, the controller 200 may include a control unit 210 and a random access memory 230.

The control unit 210 may control the general operations of the controller 200. The control unit 210 may analyze and process a signal or a request which is inputted from the host device. To this end, the control unit 210 may decode and drive firmware or software loaded on the random access memory 230. The control unit 210 may be realized in the form of hardware, software and/or any suitable combinations of hardware and software.

The random access memory 230 may store firmware and/or software to be driven by the control unit 210. The random access memory 230 may store data necessary for the driving of the firmware or the software, for example, metadata. For example, the random access memory 230 may operate as a working memory of the control unit 210.

The random access memory 230 may temporarily store data to be transmitted from the host device to the nonvolatile memory device 300 or from the nonvolatile memory device 300 to the host device. For example, the random access memory 230 may operate as a data buffer memory or a data cache memory.

Figure 2:
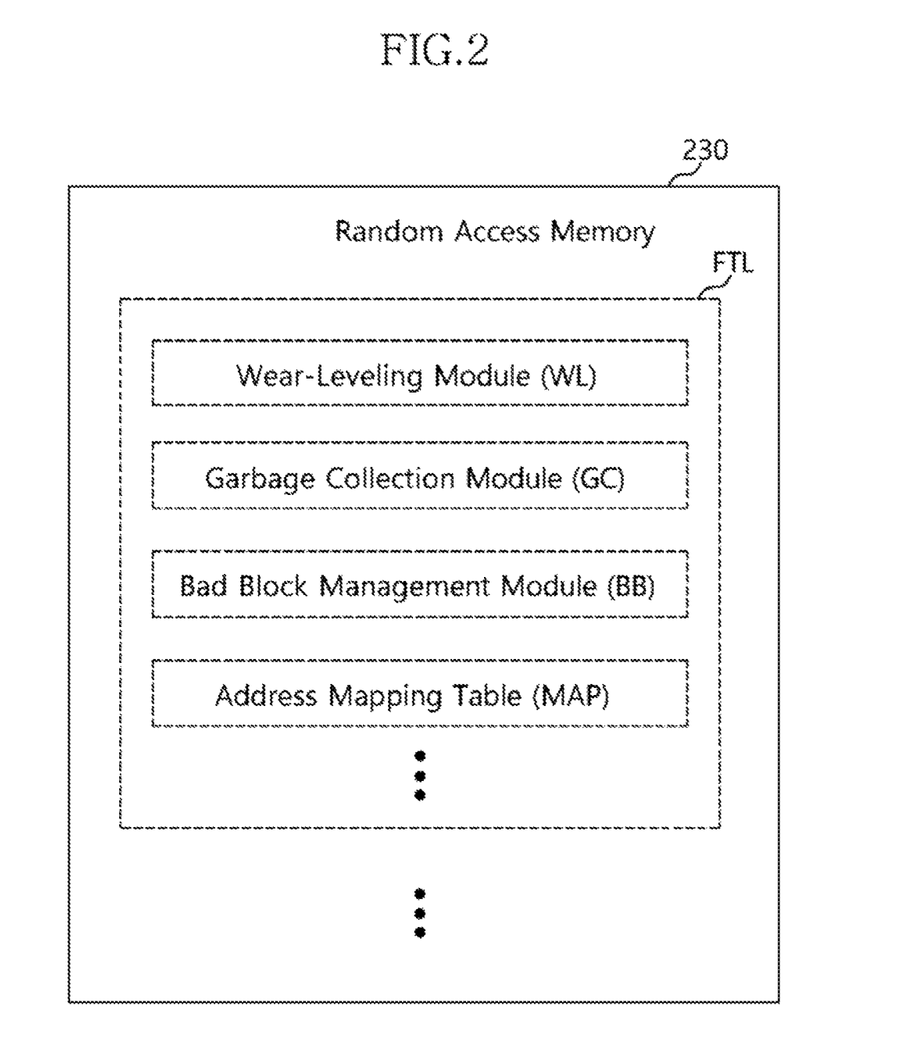
FIG. 2 is a diagram illustrating an example of a random access memory shown in FIG. 1.

FIG. 2 is a diagram illustrating an example of the random access memory 230 of FIG. 1 to assist in the explanation of firmware or software driven therein.

For example, in an embodiment the nonvolatile memory device 300 may be or include a NAND flash memory device having a plurality of memory blocks each memory block having a plurality of memory pages. In such an embodiment, the control unit 210 may control an erase operation on a basis of a memory block, and control a read or program operation on a basis of a page. Further, since it may not be possible for a NAND flash memory device to perform an overwrite operation, the control unit 210 may perform in advance an erase operation in order to store new data in memory cells where data are stored.

The control unit 210 may manage and drive firmware or software generally referred to as a flash translation layer FTL, for controlling an operation peculiar to the flash memory device and provide the data storage device 100 with compatibility to a host device. Through driving of such a flash translation layer FTL, the data storage device 100 may be recognized as a general data storage device such as a hard disk, by the host device.

The flash translation layer FTL loaded on the random access memory 230 may include one or more modules for performing various functions and metadata necessary for driving of the modules. For example, in the embodiment of FIG. 2, the flash translation layer FTL may include a wear-leveling module WL, a garbage collection module GC, a bad block management module BB, and/or an address mapping table MAP.

The wear-leveling module WL may manage the degree of wear for memory blocks or pages of the nonvolatile memory device 300. Memory cells of the nonvolatile memory device 300 may be aged by program and erase operations. Aged memory cells, that is, worn-out memory cells may cause fails (for example, physical defects). The wear-leveling module WL may manage the erase counts of memory blocks or the program counts of pages in such a way as to be equally distributed among the memory, in order to prevent a certain memory block from being worn out earlier than other memory blocks.

The garbage collection module GC may manage memory blocks used for storing fragmented data. As described above, when the nonvolatile memory device 300 is configured as a flash memory device is generally not possible to perform an overwrite operation, and the unit of an erase operation may be larger than the unit of a program operation. For this reason, the nonvolatile memory device 300 may need an operation of collecting valid data dispersed at physically different positions to one place, when a storage space reaches a limit. The garbage collection module GC may perform an operation of collecting valid data fragmented due to performance of a plurality of write and erase operations, to a collection area.

The bad block management module BB may manage a memory block in which a fail has occurred, among the memory blocks of the nonvolatile memory device 300. As described above, a fail (for example, a physical defect) may occur in a worn-out memory cell. Data stored in a defective memory cell may not be properly read out. Moreover, data may not be properly stored in a defective memory cell. The bad block management module BB may manage a memory block including a defective memory cell, to prevent its further use.

When a host device accesses the data storage device 100 (for example, requests a read operation or a write operation) the host device may provide a logical address to the data storage device 100. The data storage device 100 may convert the provided logical address into a physical address of the nonvolatile memory device 300, and perform a requested operation by referring to the converted physical address. For performing such an address converting operation, the control unit 210 may generate and manage data representing address mapping relationships, for example, the address mapping table MAP, and may include the address mapping table MAP in the flash translation layer FTL.

Figure 3:
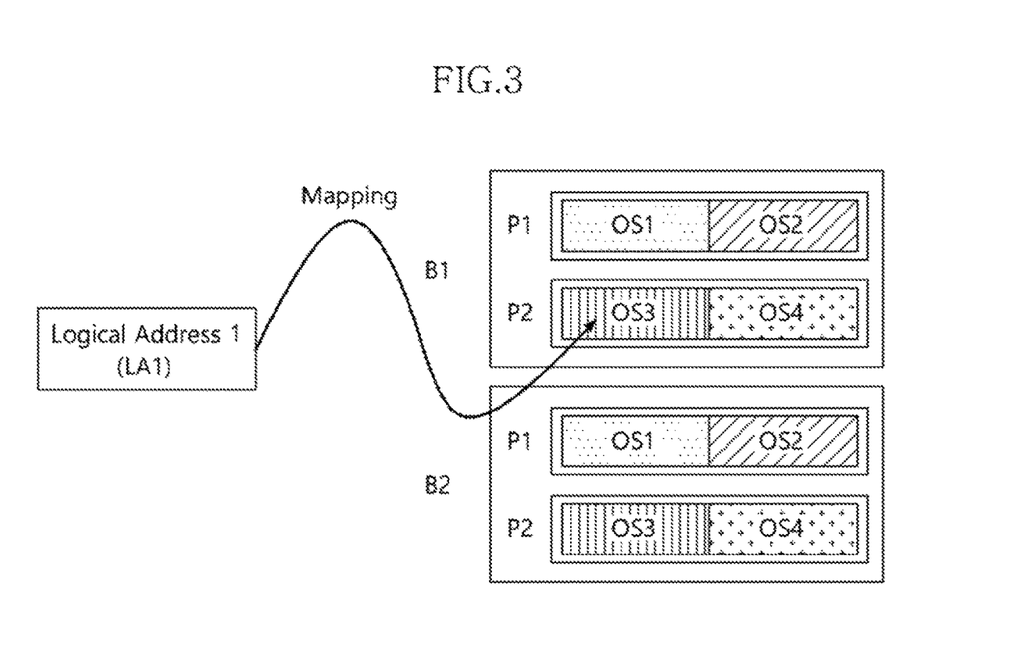
FIG. 3 is a diagram illustrating an example of address conversion, according to an embodiment of the present invention, generated according to the address conversion of FIG. 3.
Figure 4:
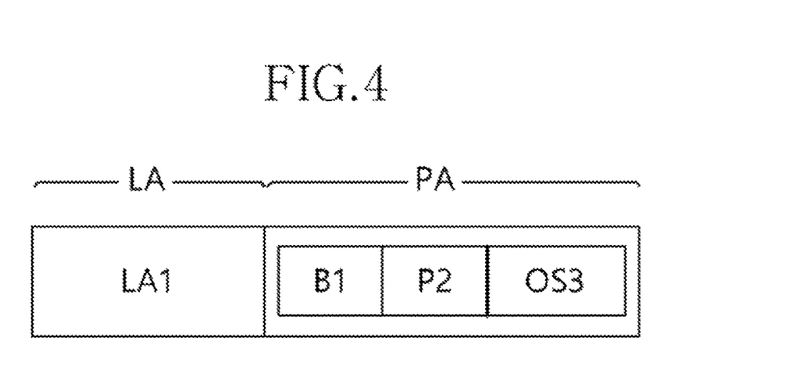

Examples, of an address mapping process and an address mapping table will now be described with reference to FIGS. 3 and 4. For simplicity, in the embodiment of FIGS. 3 and 4, only 2 memory blocks B1 and B2, each memory block having 2 pages P1 and P2, are shown for the nonvolatile memory device 300. In the case where the size of each of the pages P1 and P2 is larger than the size of data corresponding to a logical address LA, each of the pages P1 and P2 may be divided into offset units OS so that each of the pages P1 and P2 may be mapped for a plurality of logical addresses. An address of the memory block B1 or B2, an address of the page P1 or P2 identifying the memory block 61 or 62 and an offset OS1, OS2, OS3 or OS4 identifying the page P1 or P2 may be used as a physical address for accessing a corresponding memory region.

In the case where offsets are successively set in a page, an address mapping table may be constructed by an address of a men block B, an address of a page P and an offset OS. As shown in FIG. 3, in the case where offsets are successively set in a memory block, an address mapping table may be constructed by only an address of a memory block B and an offset OS.

In the case where a host device requests to write data corresponding to a logical address 1 LA1, the host device may provide the logical address 1 LA1 to the data storage device 100. The data storage device 100 may allocate the memory region of a physical address B1, P2 and OS3, as a memory region for storing the data corresponding to the logical address 1 LA1. The data storage device 100 may manage the mapping relationship of the logical address 1 LA1 and the physical address B1, P2 and OS3, in the form of a table, for reference upon address conversion.

Figure 5:
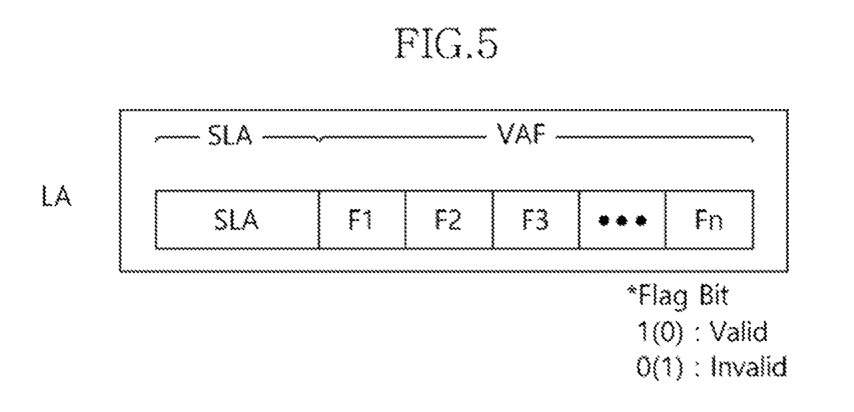
FIG. 5 is a diagram illustrating a method for constructing an address mapping table according to an embodiment of the present invention.

FIG. 5 is a diagram illustrating a method for constructing an address mapping table according to an embodiment of the invention. Since an address mapping table should include mapping relationships of physical addresses for all respective logical addresses, the size of the address mapping table may be significantly large. However, the more the size of an address mapping table is decreased, the more the resources of a data storage device necessary for storing or driving the address mapping table may be reduced.

According to an embodiment of the invention, in order to decrease the size of an address mapping table, a logical address LA of the address mapping table may be constructed in a compressed form. For example, as shown in FIG. 5, the logical address LA may be, expressed by a start logical address SLA and one or more valid address flags VAF corresponding to the start logical address SLA. In the following descriptions, a start logical address SLA, and its corresponding valid address flags VAF will be referred to as a logical address set.

In each logical address set, valid address flags F1 to Fn may respectively correspond to successive logical addresses including a start logical address, and may be used as information setting whether corresponding logical addresses are valid or not. In other words, the valid address flags VAF may indicate which logical address or addresses are valid among logical addresses corresponding to the number of the valid address flags VAF from the start logical address SLA. The fact that a logical address is valid may mean that the corresponding logical address exists in the address mapping table or the corresponding logical address is mapped to a physical address.

For instance, data "1" may be marked to set a valid logical address, and data "0" may be marked to set an invalid logical address (that is, to reset a valid logical address to an invalid logical address). For another instance, data "0" may be marked to set a valid logical address, and data "1" may be marked to set an invalid logical address. In the following descriptions, it will be described that a valid logical address is marked as "1" and an invalid logical address is marked as "0".

The start logical address SLA may be determined depending on the number of valid address flags VAF. Namely, the start logical address SLA may be increased by the number of valid address flags VAF. For example, the start logical address SLA may be increased by 2 in the case where the number of valid address flags VAF is 2, and may be increased by 3 in the case where the number of valid address flags VAF is 3.

Figure 6:
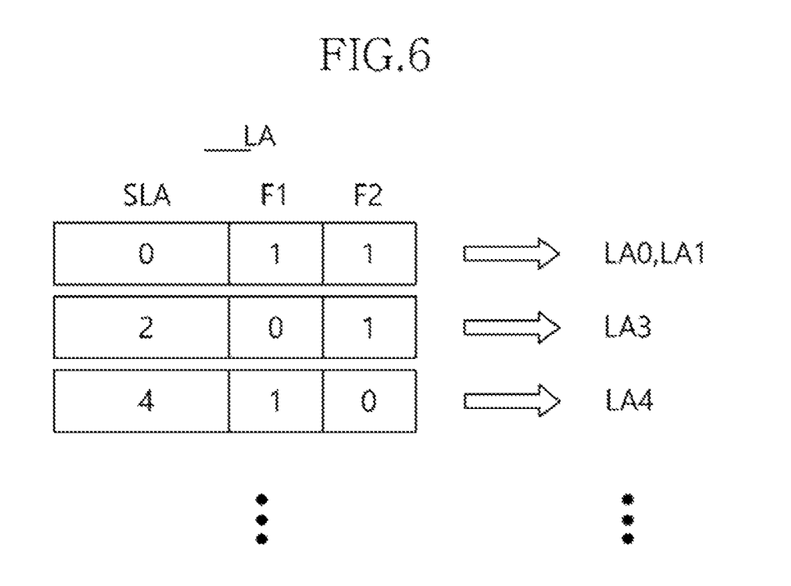
FIGS. 6 and 7 are diagrams illustrating examples of address mapping tables, according to various embodiments of the present invention.
Figure 7:
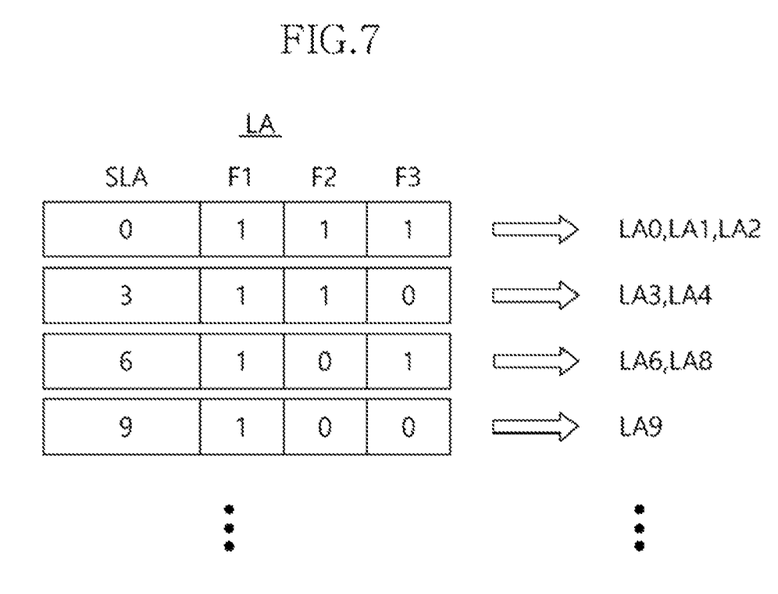

FIGS. 6 and 7 are diagrams illustrating logical addresses of compressed forms according to various embodiments of the invention. FIG. 6 exemplarily illustrates a case where the number of valid address flags VAF is 2, and FIG. 7 exemplarily illustrates a case, where the number of valid address flags VAF is 3.

Referring to FIG. 6, in a first logical address set LA, a start logical address SLA is configured by data "0". A first valid address flag F1 is configured by data "1" and a second valid address flag F2 is configured by data "1" meaning that, between first and second logical addresses LA0 and LA1 corresponding to 2 as the number of valid address flags VAF from the first logical address 0 LA0, the first logical address 0 LA0 and the second logical address 1 LA1 are valid.

Also, in a second logical address set LA, a start logical address SLA is configured by data "2" increased by 2 as the number of the valid address flags VAF is 2. A first valid address flag F1 is configured by data "0" and a second valid address flag F2 is configured by data "1". It may be meant that, between third and fourth logical addresses LA2 and LA3 corresponding to 2 as the number of the valid address flags VAF from the third logical address 2 LA2, the fourth logical address 3 LA3 is valid.

Moreover, in a third logical address set LA, a start logical address SLA is configured by data "4" increased by 2 as the number of the valid address flags VAF. A first valid address flag F1 is configured by data "1" and a second valid address flag F2 is configured by data "0", meaning that, between fifth and sixth logical addresses LA4 and LA5 corresponding to 2 as the number of the valid address flags VAF from the first logical address 4 LA4, the first logical address 4 LA4 is valid.

Referring to FIG. 7, in a first logical address set LA, a start logical address SLA is configured by data "0", and a first valid address flag F1 is configured by data "1". A second valid address flag F2 is configured by data "1" and a third valid address flag F3 is configured by data "1", meaning that, among first, second and third logical addresses LA0, LA1 and LA2 corresponding to 3 as the number of valid address flags VAF from the first logical address 0 LA0, the first logical address 0 LA0, the second logical address 1 LA1 and the third logical address 2 LA2 are valid.

Also, in a second logical address set LA, a start logical address SLA is configured by data "3" increased by 3 as the number of the valid address flags VAF, and a first valid address flag F1 is configured by data "1". A second valid address flag F2 is configured by data "1" and a third valid address flag F3 is configured by data "0", meaning that, among fourth, fifth, and sixth logical addresses LA3, LA4 and LA5 corresponding to 3 as the number of the valid address flags VAF from the fourth logical address 3 LA3 the fourth logical address 3 LA3 and the fifth logical address 4 LA4 are valid.

Moreover, in a third logical address set LA, a start logical address SLA is configured by data "6" increased by 3 as the number of the valid address flags VAF, and a first valid address flag F1 is configured by data "1". A second valid address flag F2 is configured by data "0" and a third valid address flag F3 is configured by data "1" meaning that, among seventh, eighth, and ninth logical addresses LA6, LA7 and LA8 corresponding to 3 as the number of the valid address flags VAF from seventh the logical address 6 LA6, the seventh logical address 6 LA6 and the ninth logical address 8 LA8 are valid.

Further, in a fourth logical address set LA, a start logical address SLA is configured by data "9" increased by 3 as the number of the valid address flags VAF, and a first valid address flag F1 is configured by data "0". A second valid address flag F2 is configured by data "0" and a third valid address flag F3 is configured by data "0", meaning that, among tenth, eleventh, and twelfth logical addresses LA9, LA10 and LA11 corresponding to 3 as the number of the valid address flags VAF from the tenth logical address 9 LA9, the tenth logical address 9 LA9 is valid.

Figure 8:
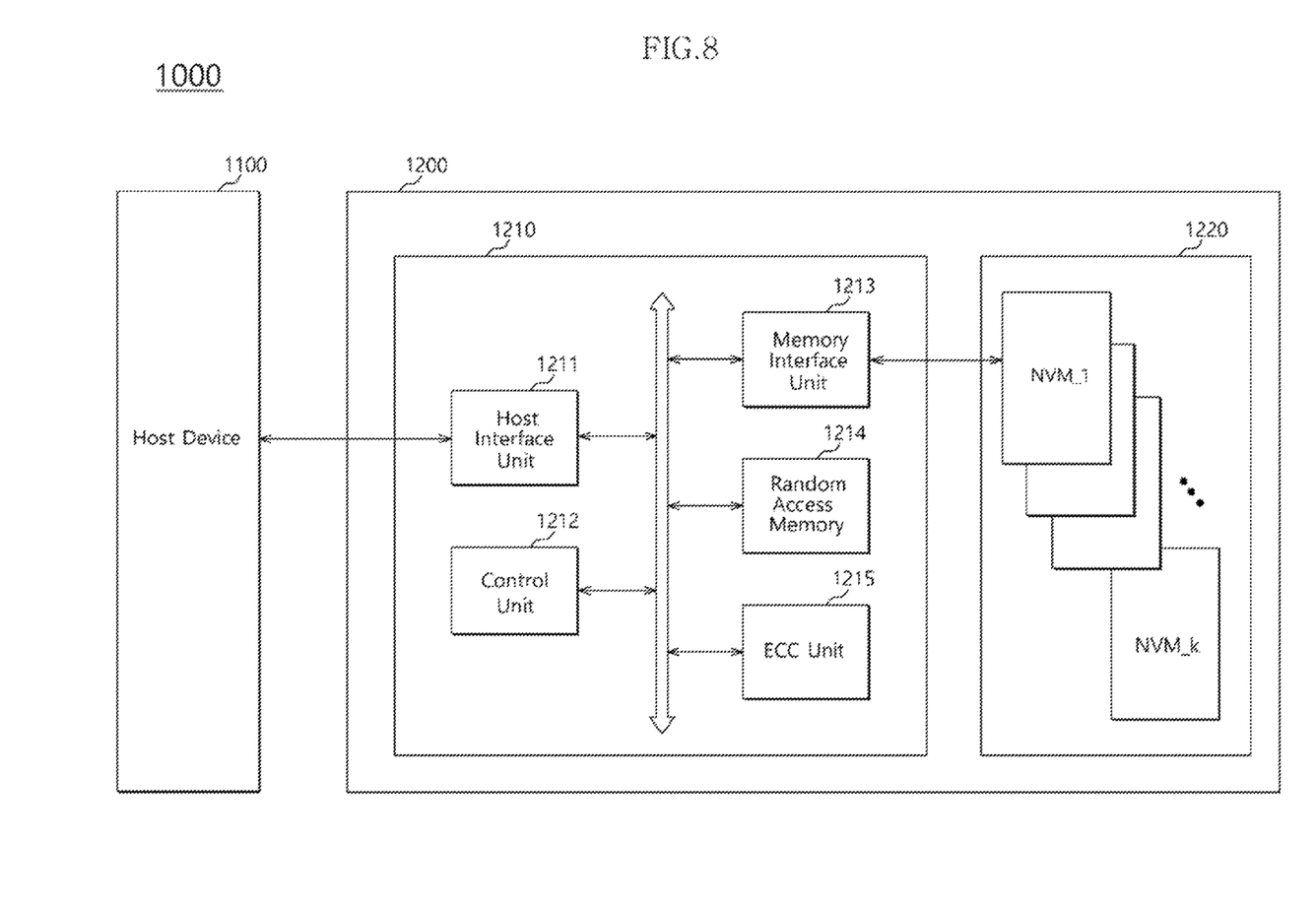
FIG. 8 is a block diagram illustrating a data processing system including a data storage device, according to an embodiment of the present invention.

Hence, according to an embodiment, of the present invention, a data storage device 100 is provided which may compress one or more logical addresses received from a host device and construct one or more logical address sets in order to reduce the size of the address mapping table. For example, each of the logical address sets may only include a start logic address and one or more valid address flags indicating whether successive logical addresses from the start logical address are valid or not. In this manner, the address mapping table need not include all the logical addresses received from the host device. FIG. 8 block diagram illustrating a data processing system including a data storage device according to an embodiment of the invention.

A data processing system 1000 may include a host device 1100 and a data storage device 1200. The data storage device 1200 may include a controller 1210 and a nonvolatile memory device 1220. The data storage device 1200 may be coupled to the host device 1100 such as a mobile phone, an MP3 player, a laptop computer, a desktop computer, a game player, a TV, an in-vehicle infotainment system, and/or the like.

The controller 1210 may include a host interface unit 1211, a control unit 1212, a memory interface unit 1213, a random access memory 1214, and an error correction code (ECC) unit 1215.

The control unit 1212 may control the general operations of the controller 1210 in response to a request from the host device 1100. The control unit 1212 may drive firmware or software for controlling the nonvolatile memory device 1220. The control unit 1212 may manage an address mapping table of a compressed form, as the one described above with reference to FIG. 5.

The random access memory 1214 may be used as a working memory of the control unit 1212. The random access memory 1214 may be employed as a buffer memory for storing temporarily the data read from the nonvolatile memory device 1220 or the data provided from the host device 1100.

The host interface unit 1211 may interface the host device 1100 and the controller 1210. For example, the host interface unit 1211 may communicate with the host device 1100 through one of various interface protocols such as a universal serial bus (USB) protocol, a universal flash storage (UFS) protocol a multimedia card (MMC) protocol, a peripheral component interconnection (PCI) protocol, a PCI express (PCI-E) protocol, a parallel advanced technology attachment (PATA) protocol, a serial advanced technology attachment (SATA) protocol, a small computer system interface (SCSI) protocol, a serial attached SCSI (SAS) protocol and/or the like.

The memory interface unit 1213 may interface the controller 1210 and the nonvolatile memory device 1220. The memory interface unit 1213 may provide commands and addresses to the nonvolatile memory device 1220. Furthermore, the memory interface unit 1213 may exchange data with the nonvolatile memory device 1220.

The error correction code unit 1215 may detect an error of the data read from the nonvolatile memory device 1220. Also, the error correction code unit 1215 may be configured to correct the detected error when the detected error is within a correctable range.

The nonvolatile memory device 1220 may be employed as a storage medium of the data storage device 1200. The nonvolatile memory device 1220 may include a plurality of nonvolatile memory chips (or dies) NVM_1 to NVM_k.

The controller 1210 and the nonvolatile memory device 1220 may be manufactured as any one of various data storage devices. For example, the controller 1210 and the nonvolatile memory device 1220 may be integrated into one semiconductor device and may be manufactured as any one of a multimedia card in the form of an MMC, an eMMC, an RS-MMC and a micro-MMC, a secure digital card in the form of an SD, a mini-SD and an micro-SD, a universal serial bus (USB) storage device, a universal flash storage (UFS) device, a personal computer memory card international association (PCMCIA) card, a compact flash (CF) card, a smart media card, a memory stick, and/or the like.

Figure 9:
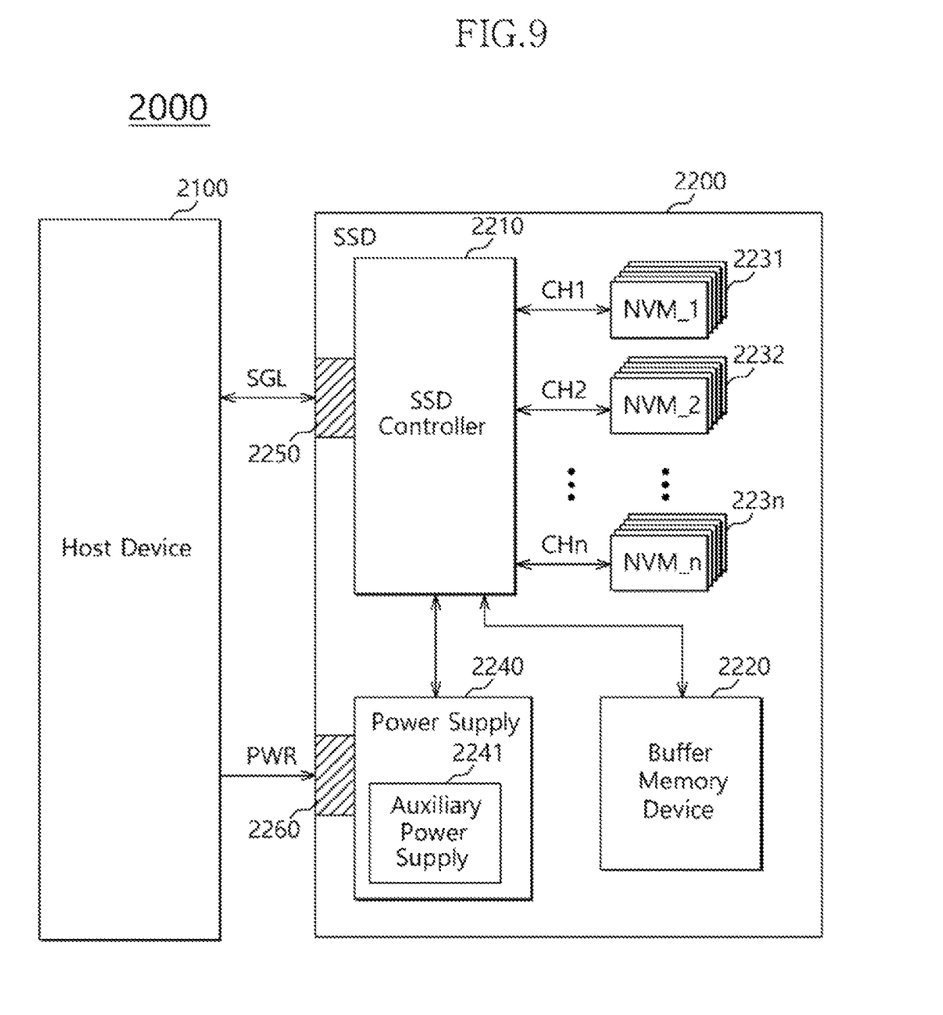
FIG. 9 is a block diagram illustrating a data processing system including a solid state drive (SSD), according to an embodiment of the present invention.

FIG. 9 is a block diagram illustrating a data processing system including a solid state drive (SSD), according to an embodiment of the invention.

A data processing system 2000 may include a host device 2100 and a solid state drive (SSD) 2200.

The SSD 2200 may include an SSD controller 2210, a buffer memory device 2220, nonvolatile memory devices 2231 to 223n, a power supply 2240, a signal connector 2250, and a power connector 2260.

The SSD controller 2210 may access the nonvolatile memory devices 2231 to 223n in response to a request from the host device 2100.

The buffer memory device 2220 may temporarily store data which are to be stored in the nonvolatile memory devices 2231 to 223n. Further, the buffer memory device 2220 may temporarily store data which are read from the nonvolatile memory devices 2231 to 223n. The data red temporarily in the buffer memory device 2220 may be transmitted to the host device 2100 or the nonvolatile memory devices 2231 to 223n under the control of the SSD controller 2210.

The nonvolatile memory devices 2231 to 223n may be used as storage media of the SSD 2200. The nonvolatile memory devices 2231 to 223n may be coupled with the SSD controller 2210 through a plurality of channels CH1 to CHn, respectively. One or more nonvolatile memory devices may be coupled to one channel. The nonvolatile memory devices coupled to one channel may be coupled to the same signal bus and data bus.

The power supply 2240 may provide power PWR inputted through the power connector 2260, to the inside of the SSD 2200. The power supply 2240 may include an auxiliary power supply 2241. The auxiliary power supply 2241 may supply power so as to allow the SSD 2200 to be properly terminated when a sudden power-off occurs. The auxiliary power supply 2241 may include super capacitors capable of being charged with the power PWR.

The SSD controller 2210 may exchange a signal SGL with the host device 2100 through the signal connector 2250. The signal SGL may include a command, an address, data, and/or the like. The signal connector 2250 may be configured for various protocols such as parallel advanced technology attachment (PTA), serial advanced technology attachment (SATA), small computer system interface (SCSI), serial attached SCSI (SAS), peripheral component interconnection (PCI) and PCI express (PCI-E) protocols, depending on the interface scheme between the host device 2100 and the SSD 2200.

Figure 10:
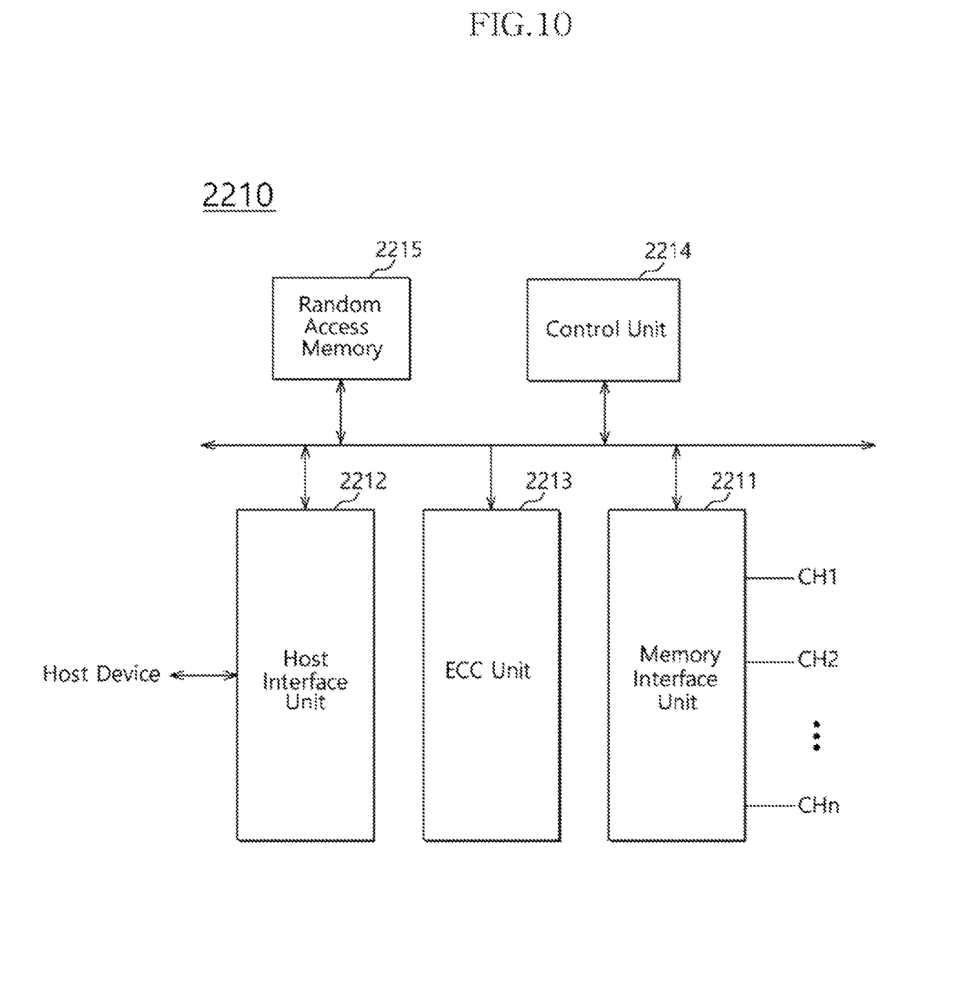
FIG. 10 is a block diagram illustrating an example of an SSD controller shown in FIG. 9.

FIG. 10 is a block diagram illustrating the SSD controller shown in FIG. 9. Referring to FIG. 10, the SSD controller 2210 may include a memory interface unit 2211, a host interface unit 2212, an error correction code (ECC) unit 2213, a control unit 2214, and a random access memory 2215.

The memory interface unit 2211 may provide a control signal such as a command and an address to the nonvolatile memory devices 2231 to 223n. Moreover, the memory interface unit 2211 may exchange data with the nonvolatile memory devices 2231 to 223n. The memory interface unit 2211 may scatter the data transmitted from the buffer memory device 2220 to the channels CH1 to CHn, under the control of the control unit 2214. Furthermore, the memory interface unit 2211 may transmit the data read from the nonvolatile memory devices 2231 to 223n to the buffer memory device 2220, under the control of the control unit 2214.

The host interface unit 2212 may provide interfacing with the SSD 2200 in correspondence to the protocol of the host device 2100. For example, the host interface unit 2212 may communicate with the host device 2100 through one of parallel advanced technology attachment (PATA), serial advanced technology attachment (SATA), small computer system interface (SCSI), serial attached SCSI (SAS), peripheral component interconnection (PCI) and PCI express (PCI-E) protocols. In addition, the host interface unit 2212 may perform a disk emulation function of supporting the host device 2100 to recognize the SSD 2200 as a hard disk drive (HDD).

The ECC unit 2213 may generate parity bits based on the data transmitted to the nonvolatile memory devices 2231 to 223n. The generated parity bits may be stored along with data in the nonvolatile memory devices 2231 to 223n. The ECC unit 2213 may detect an error of the data read from the nonvolatile memory devices 2231 to 223n. When the detected error is within a correctable range, the ECC unit 2213 may correct the detected error.

The control unit 2214 may analyze and process the signal SGL inputted from the host device 2100. The control unit 2214 may control the operations of the buffer memory device 2220 and the nonvolatile memory devices 2231 to 223n based on firmware or software for driving the SSD 2200. The control unit 2214 may manage an address mapping table of a compressed form, like the one described above with reference to FIG. 5.

The random access memory 2215 may be used as a working memory for driving the firmware or the software.

Figure 11:
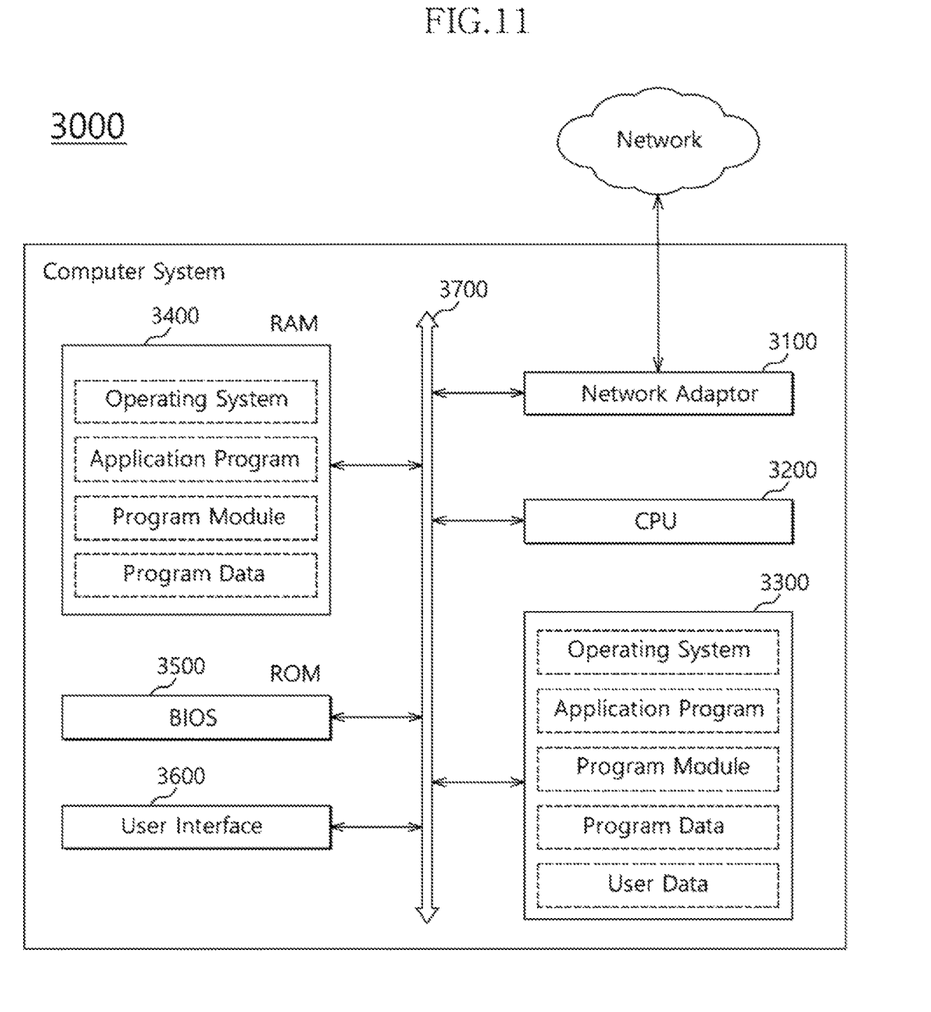
FIG. 11 is a block diagram illustrating a computer system including a data storage device according to an embodiment of the present invention.

FIG. 11 is a block diagram illustrating a computer system to which the data storage device according to the embodiment is mounted. Referring to FIG. 11, a computer system 3000 may include a network adaptor 3100, a central processing unit 3200, a data storage device 3300, a RAM 3400, a ROM 3500 and a user interface 3600, which are electrically coupled to a system bus 3700. The data storage device 3300 may be constructed by the data storage device 100 shown in FIG. 1, the data storage device 1200 shown in FIG. 8 or the SSD 2200 shown in FIG. 9.

The network adaptor 3100 may provide interfacing between the computer system 3000 and external networks. The central processing unit 3200 may perform general operations for driving an operating system or an application program loaded on the RAM 3400.

The data storage device 3300 may store general data necessary for the computer system 3000. For example, an operating system for driving the computer system 3000, an application program, various program modules program data and user data may be stored in the data storage device 3300.

The RAM 3400 may be used as the working memory of the computer system 3000. Upon booting, the operating system, the application program, the various program modules and the program data necessary for driving programs, which are read from the data storage device 3300, may be loaded on the RAM 3400. A BIOS (basic input/output system) which is activated before the operating system is driven may be stored in the ROM 3500. Information exchange between the computer system 3000 and a user may be implemented through the user interface 3600.

Figure 12:
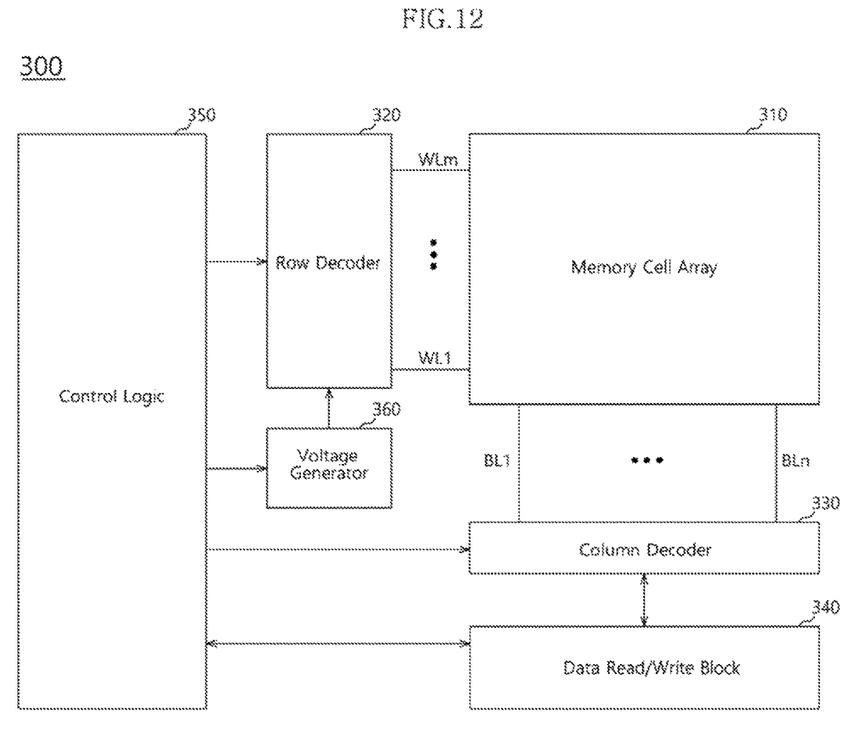
FIG. 12 is a block diagram illustrating a nonvolatile memory device included in a data storage device, according to an embodiment of the present invention.

FIG. 12 is a block diagram illustrating a nonvolatile memory device included in a data storage device according to an embodiment of the invention. Referring to FIG. 12, the nonvolatile memory device 300 may include a memory cell array 310, a row decoder 320, a column decoder 330, a data read/write block 340, a control logic 350, and a voltage generator 360.

The memory cell array 310 may include a plurality of memory cells arranged at areas where word lines WL1 to WLm and bit lines BL1 to BLn intersect with each other. The memory cells may be grouped into an access unit, such as a memory block as an erase unit and a page as a program and read unit.

The row decoder 320 may be coupled with the memory cell array 310 through the word lines WL1 to WLm. The row decoder 320 may operate according to the control of the control logic 350. The row decoder 320 may decode an address provided from an external device (not shown). The row decoder 320 may select and drive the word lines WL1 to WLm, based on a decoding result. For instance, the row decoder 320 may provide a word line voltage provided from the voltage generator 360, to the word lines WL1 to WLm.

The column decoder 330 may be coupled with the memory cell array 310 through the bit lines BL1 to BLn. The column decoder 330 may operate according to the control of the control logic 350. The column decoder 330 may decode an address provided from the external device. The column decoder 330 may couple the bit lines BL1 to BLn with corresponding read/write circuits of the data read/write block 340, respectively, based on a decoding result. Also, the column decoder 330 may drive the bit lines BL1 to BLn, based on the decoding result.

The data read/write block 340 may operate according to the control of the control logic 350. The data read/write block 340 may operate as a write driver or a sense amplifier depending on an operation mode. For example, the data read/write block 340 may operate as a write driver which stores data provided from the external device, in the memory cell array 310 in a write operation. For another example, the data read/write block 340 may operate as a sense amplifier which reads out data from the memory cell array 310 in a read operation.

The voltage generator 360 may generate voltages to be used in internal operations of the nonvolatile memory device 300. The voltages generated by the voltage generator 360 may be applied to the memory cells of the memory cell array 310. For example, a program voltage generated in a program operation may be applied to a word line of memory cells which are subject to the program operation. For another example, an erase voltage generated in an erase operation may be applied to a well area of memory cells which are subject to the erase operation. For still another example, a read voltage generated in a read operation may be applied to a word line of memory cells which are subject to the read operation.

The control logic 350 may control general operations of the nonvolatile memory device 300, based on control signals provided from the external device (for example, a control unit). For example, the control logic 350 may control operations of the nonvolatile memory device 300 such as read, write and erase operations of the nonvolatile memory device 300.

While various embodiments have been described above, it will be understood to those skilled in the art that the embodiments described are provided as examples of the invention only.

It is noted that the invention should not be limited based on the described embodiments, and many other embodiments or variations thereof may be envisaged by those skilled in the art to which this invention pertains without departing from the spirit and/or scope of the invention as defined by the appended claims.

What is claimed is:

1. A data storage device comprising:
    a nonvolatile memory device; and
    a controller suitable for constructing a plurality of logical address set based on all logical addresses provided from a host device, wherein each of the plurality of logical address sets includes a start logical address of one or more logical addresses included in a corresponding logical address set and one or more valid address flags corresponding to each of the one or more logical addresses and for generating an address mapping table by mapping each of the plurality of logical address sets to a physical address of the nonvolatile memory device,
    wherein the one or more valid address flags indicates whether the corresponding each of the one or more logical addresses is valid or not,
    wherein a valid logical address includes a logical address existing in the address mapping table or a logical address mapped to the physical address, and
    wherein the controller determines that a logical address corresponding to a valid address flag in a set state is the valid logical address and a logical address corresponding to a valid address flag in a reset state is an invalid logical address.

2. The data storage device according to claim 1, wherein the controller increases start logical addresses of the logical address sets from one to another, by the number of the valid address flags.

3. The data storage device according to claim 1, wherein the controller uses at least one of an address of a memory block of the nonvolatile memory device, an address of a page identifying the memory block and an offset identifying the page, as the physical address.

4. A data storage device comprising:
    a nonvolatile memory device; and
    a controller suitable:
    for constructing a plurality of logical address sets based on all logical addresses, wherein each of the plurality of logical address sets includes a start logical address of one or more logical addresses included in a corresponding logical address set and one or more valid address flags corresponding to each of the one or more logical addresses,
    wherein the one or more valid address flags indicates whether the corresponding each of the one or more logical addresses is valid or not, and
    wherein a valid logical address includes a logical address mapped to a physical address of the nonvolatile memory device.

5. The data storage device according to claim 4, wherein start logical addresses of first and second logical address sets are apart in addresses by the number of the valid address flags.

6. A method for operating a data storage device a nonvolatile memory device, comprising:
    constructing a plurality of logical address sets based on all logical addresses provided from a host device, wherein each of the plurality of logical address sets includes a start logical address of one or more logical addresses included in a corresponding logical address set and one or more valid address flags corresponding to each of the one or more logical addresses;
    generating an address mapping table by mapping each of the plurality of logical address sets to a physical address of the nonvolatile memory device; and performing a request from the host device, by referring to the address mapping table, wherein the one or more valid address flags indicates whether the corresponding each of the one or more logical addresses is valid or not, wherein a valid logical address includes a logical address existing in the address mapping table or a logical address mapped to the physical address, and wherein the performing of the request includes determining that a logical address corresponding to a valid address flag in a set state is the valid logical address and a logical address corresponding to a valid address flag in a reset state is an invalid logical address.

7. The method according to claim 6, wherein start logical addresses of the logical address sets are increased from one to another by the number of the valid address flags.

8. The method according to claim 6, wherein the physical address includes at least one of an address of a memory block of the nonvolatile memory device, an address of a page identifying the memory block and an offset identifying the page.

* * * * *